Oct. 20, 1936. A. D. HADSEL Re. 20,136
ROCK CRUSHER
Original Filed May 9, 1930
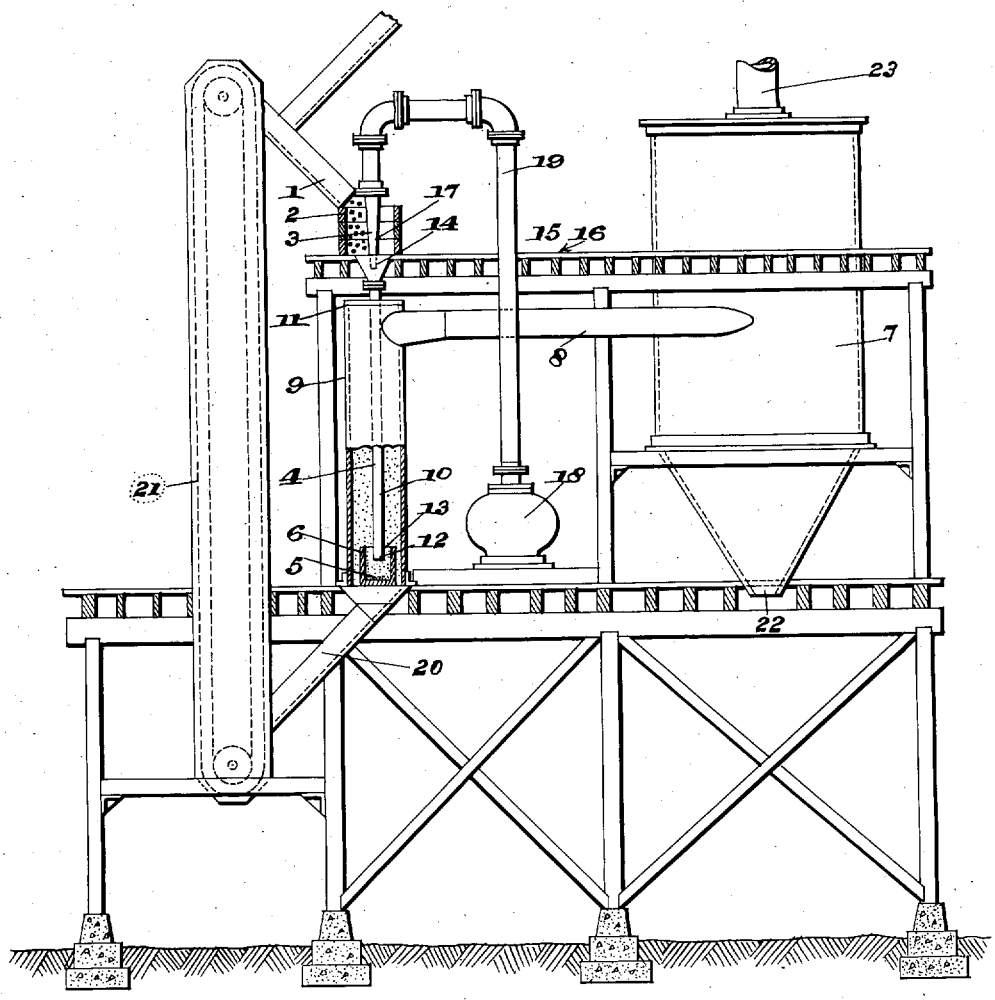
Inventor
Alvah D. Hadsel.
By Munn & Co.
Attorney Reissued Oct. 20, 1936

Re. 20,136

UNITED STATES PATENT OFFICE 20,136

ROCK CRUSHER

Alvah D. Hadsel, Oakland, Calif., assignor to Monarch Development Company, Ltd.

Original No. 1,854,256, dated April 19, 1932, Serial No. 451,110, May 9, 1930. Application for reissue December 21, 1932, Serial No. 648,312

6 Claims. (Cl. 83—46)

The present invention relates to improvements in rock crushers, and it consists in the combinations, constructions and arrangements hereinafter described and claimed.

An object of my invention is to provide a rock crusher in which an air blast is associated with a rock feeding means for forcing the rocks entering thereinto against breaker blocks or against a bed of temporarily retained rocks.

A further object of my invention resides in the provision of suction means which is active on the smaller particles of rocks of a predetermined size for segregating the same from the larger rocks.

A still further object is to provide means for returning the oversized rocks to the rock feeding means and to be thrust against the breaker blocks until they have been reduced to the desired size.

A further object of my invention is to provide a method of and a means for disintegrating ore by repeated impact with an impact medium in a closed circuit while classifying the ore simultaneously for removal of the fines immediately after each impact.

A further object of the invention is to arrange the impact medium in such a manner that partly crushed ore will gather thereon and thus take the impact of the ore whereby the life of the impact medium is lengthened.

A further object of the invention is to provide means for discharging the ore against the impact medium from above so that the force of gravity will serve to produce a crushing effect when the ore strikes the impact medium.

A still further object is to produce a rock crusher that is simple in construction, durable and efficient for the purpose intended.

Other objects and advantages will appear as the specification proceeds, and the novel features will be particularly pointed out in the annexed claims.

My invention is illustrated in the accompanying drawing forming a part of this specification, in which the figure represents vertical section through a rock crusher constructed in accordance with my invention, parts thereof being shown in elevation.

The preferred form of my invention is illustrated in the figure and comprises means indicated at 1 for feeding or delivering rocks into a receiving compartment 2, the latter having an air blast conduit 3 projecting thereinto for forcing the rocks through a tubular member 4 and against a bed of rocks 5 which are temporarily held in a retainer 6. As the new rocks are thrust against the bed of rocks 5, they are reduced in size and at the same time the rocks comprising the bed are also broken up. The retainer 6 may be considered a breaker block with upwardly extending side flanges. The finer particles of rock are conveyed to a cyclone 7 by means hereinafter described through a conduit 8 which communicates at one end with the cyclone and at its opposite end with a housing 9 which encircles the tubular member 4 in substantially concentric relation.

The tubular member 4 comprises a tube portion 10 which extends through the closed top 11 of the housing 9 and has its open end 12 disposed in the retainer 6, the latter being opened at 13 for the purpose hereinafter set forth. The uppermost end of the tube 10 has a conical-shaped member 14 secured thereto and supported in the receiving compartment 2 by means of the floor 15 of the superstructure 16. As the rocks enter the compartment 2 from the feeding means 1, they drop by gravity into the conical member 14 and are accelerated by the blast of air emitting from a nozzle 17. The air blast may be created by any suitable means, and in the present illustration I have shown a blower 18 which is connected to the nozzle 17 by a pipe 19.

The rocks discharging from the end 12 of the tubular member 4 rebound to some extent when they strike the bed or rocks 5 and some of them leave the retainer 6 through the open end 13, the lighter ones being conveyed through the conduit 8 as later described, while the heavier ones drop into a chute 20 and are again returned to the feeding means 1 by a bucket conveyer 21.

The rocks are thus circulated through the tubular member 4 until they are reduced to substantially #200 mesh when used as a filler for asphalt. The column of air rising from the open end of the tube 10 will carry therewith these finer parts of rocks through the conduit 8 and into the cyclone 7. The particles will then gradually settle by gravity. The bottom of the cyclone is preferably open at 22 for allowing the rock particles to be discharged into sacks or the like (not shown).

A low vacuum exhauster 23 may be associated with the cyclone in order to draw rocks of a larger size than the ones which are lifted by the air rising from the tube 10.

The exact construction of the superstructure 16 is immaterial as long as the several elements are supported in proper relation with respect to each other.

From the description of the various parts of the rock crusher, the operation thereof may be readily understood. Rocks entering through the delivering means 1 are forced against the bed of rocks 5 by means of the air blast discharging from the nozzle 17. The finer particles of rocks are carried by the rising column of air or else drawn by the low vacuum exhauster 23 into the cyclone 7.

While I have shown and described only the preferred forms of my invention, I wish to have it understood that I reserve the right to make changes or modifications within the scope of the appended claims without departing from the spirit of the invention.

I claim:

1. A rock crusher comprising a closed circuit including a tubular member, means for feeding rocks downwardly into the tubular member, a retainer for holding a bed of rocks at the opposite end thereof, means for violently thrusting the rocks entering the tubular member against the bed of retained rocks and means for returning rocks larger than a predetermined size back to the tubular member for further crushing.

2. A rock crusher comprising a substantially vertical tubular member, means for feeding rocks to the upper end of the tubular member, pressure fluid means for projecting said rocks into the tubular member, and a breaker block adjacent to the lower and outlet end of the tubular member, said block having means for holding a bed of rocks in front of the outlet end of the tubular member.

3. A rock crusher comprising a substantially vertical tubular member, means for feeding rocks to the upper end of the tubular member, pressure fluid means for projecting said rocks into the tubular member, and a flanged breaker block adjacent to the lower and outlet end of the tubular member, the flange of the block surrounding the block in cup-form and holding a bed of rocks in front of the outlet end of the tubular member.

4. A rock crusher comprising a substantially vertical tubular member, means for feeding rocks into the upper end of the tubular member, and a cupped breaker block into which the lower and outlet end of the tubular member extends, said cupped block containing a bed of rocks for impact by the rocks discharged from the tubular member.

5. A rock crusher comprising a substantially vertical tubular member, means for feeding rocks into the upper and inlet end of the tubular member, a cupped breaker block confronting the lower and outlet end of the tubular member, means for projecting the rocks entering the tubular member toward said breaker block, said breaker block being cupped as stated so as to retain a shallow bed of rocks for impact by the rock-discharge from said outlet, the broken rocks rebounding from said bed over the rim of the cup, means to carry away the lighter rebounded rock particles, and means to confine the heavier rebounded rock particles to a closed circuit which begins at the breaker block and ends at said inlet end.

6. A rock crusher comprising a substantially vertical tubular member, a receiving compartment with which the upper and inlet end of said member communicates, means for feeding rocks to the receiving compartment so that they will go into the tubular member, pressure fluid means directed into the inlet to shoot the rocks through the tubular member, a breaker block confronting the lower and outlet end of said member, said block having means for holding a shallow rock bed so that the rocks shot out will strike the bed and spare the block, the rock fragments rebounding from the bed and over the holding means, and a housing confining the fragments and enclosing portions of both the breaker block and tubular member.

ALVAH D. HADSEL.